United States Patent

Mullin

[15] 3,641,488
[45] Feb. 8, 1972

[54] MULTIPLE-CONDITION AUTOMOTIVE ALARM SYSTEM

[72] Inventor: William F. Mullin, Indianapolis, Ind.
[73] Assignee: P. R. Mallory & Co. Inc., Indianapolis, Ind.
[22] Filed: Sept. 21, 1970
[21] Appl. No.: 74,196

Related U.S. Application Data

[63] Continuation of Ser. No. 639,944, May 22, 1967, abandoned.

[52] U.S. Cl. ........................................................340/52 F
[51] Int. Cl. ........................................................G08b 7/00
[58] Field of Search ..............340/52, 52 D, 52 F; 307/10 BP

[56] References Cited

UNITED STATES PATENTS

| 2,799,843 | 7/1957 | Savino | 340/52 |
|---|---|---|---|
| 3,376,548 | 4/1968 | Jabbar et al. | 340/52 |
| 3,422,398 | 1/1969 | Rubin | 340/63 |
| 2,571,360 | 10/1951 | Hallerberg | 340/52 F |
| 2,957,160 | 10/1960 | Taganyi et al. | 340/52 |
| 3,422,398 | 1/1969 | Rubin | 340/52 |

*Primary Examiner*—John W. Caldwell
*Assistant Examiner*—Howard Cohen
*Attorney*—Richard H. Childress

[57] ABSTRACT

An electrical audible alarm unit connected across a vehicle battery through a number of switches for indicating the presence of one of a number of conditions or malfunctions. Isolation diodes are used at avoid the coupling of electrical circuits within the vehicle. Switches may be connected to both terminals of the alarm unit, with or without isolation diodes, to provide a warning signal only when certain conditions are met.

9 Claims, 4 Drawing Figures

INVENTOR.
WILLIAM F. MULLIN
BY
ATTORNEY

MULTIPLE-CONDITION AUTOMOTIVE ALARM SYSTEM

This is a continuation of application Ser. No. 639,944, filed May 22, 1967, now abandoned.

The present invention concerns alarm systems for motor vehicles, and more particularly an alarm system operable to sound an audible alarm upon the occurrence of one or more of a number of conditions or malfunctions within the vehicle.

The ever-growing complexity and number of devices in modern automobiles and motor vehicles makes the detection of conditions within the various subunits of the vehicle increasingly difficult. At the same time, however, these subunits become increasingly interdependent, and a malfunction or improper condition in one subunit can have results ranging from the inconvenient, such as a parking brake left partially engaged, to the fatal, such as an unsuspected loss of fluid from a master brake cylinder. Individual instrumentation for every such subunit within the vehicle becomes difficult in this situation, and has already been reduced to the point of providing simple go-no go indicators for only those units which are most prone to malfunction or whose malfunctions have the most serious consequences. The primary problem in this regard is not that a large number of indicators could not be provided, but rather that such a proliferation would decrease the attention-getting qualities of any one of the indicators. Another difficulty with conventional dashboard lamps for condition indication is that they require that the driver divert his vision from the road in order to detect the malfunction or other condition which they present.

The present invention would retain at least some of the individualized instruments now found in motor vehicles, particularly those whose malfunction cannot be ascertained without a simple test by the vehicle operator. In addition, however, the present invention provides a single audible alarm to warn the driver that some malfunction or some prescribed condition has occurred. This audible warning, which is in any event more attention-seeking than, for instance, a dashboard pilot lamp, has the further advantage that the operator need not divert his attention from his driving at frequent intervals in order to ascertain whether or not some malfunction has taken place. In this sense, the invention supplements existing instrumentation by calling the operator's attention to his indicators only when necessary. In another sense, the invention allows the elimination of indicators for conditions whose nature becomes obvious upon a generalized warning that some untoward situation exists.

Generally speaking, the present invention performs these functions by means of an audible alarm unit having a pair of terminals, a distribution circuit connected to at least one of these terminals, a number of switches each sensing a particular condition within a vehicle and a number of lead wires connecting the sensor switches with the distribution circuit for sounding the alarm unit when preselected combinations of these switches are closed.

Accordingly, it is a primary object of the present invention to provide an alarm system for a motor vehicle having a single, attention-getting alarm unit for indicating the presence of a plurality of conditions or malfunctions within the vehicle.

Another object of the invention is to provide such an alarm system which is simple and inexpensive, and one which requires no modification to existing electrical wiring within the vehicle.

Other objects and advantages of the invention, as well as modifications obvious to one skilled in the art, will appear from the following description taken in conjunction with the accompanying drawings, in which.

Figure 1:
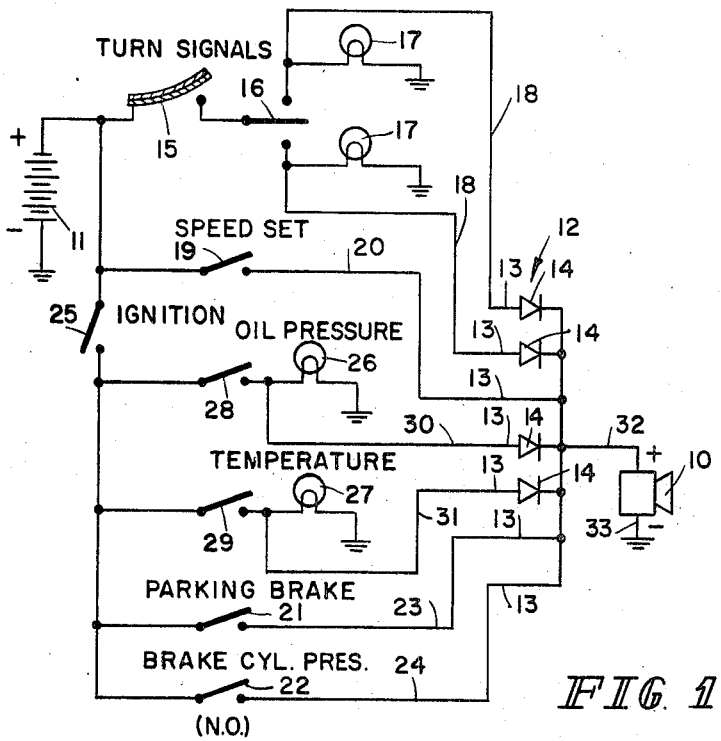
FIG. 1 is a schematic diagram of a first form of the invention.

Referring more particularly to FIG. 1, an audible alarm unit 10 receives an excitation and supply voltage from a source of potential or battery 11 through a distribution circuit 12 fed by a plurality of condition sensors within the vehicle. The battery 11 may conveniently be the vehicle battery; the alarm unit 10 is preferably of the low-voltage, self-contained type operated by the application of a single supply voltage, which therefore draws no current except when it is actually sounding. The distribution circuit 12 provides a plurality of inputs 13 operable to sound the alarm unit 10. The distribution circuit also provides, where necessary, isolation between various ones of the inputs 13 by means of the diodes 14. That is, the diodes 14 are back to back for currents attempting to feed through from one isolated input 13 to another input 13 similarly isolated, thus preventing a false response by an individual indicator connected to one of the inputs 13.

A number of sensors, representative of those which may be found in a motor vehicle, is shown in FIG. 1. More specifically, one such sensor is a turn-signal system having a bimetallic flasher switch 15, a double-throw turn switch 16 and a plurality of external lamps 17. A pair of leads 18 runs from the ungrounded sides of these lamps to a pair of the inputs 13; these inputs 13 are isolated from each other by diodes 14 to prevent the lamps on both sides of the vehicle from flashing when the switch 16 is closed. It will be noted that this circuit then indicates, by a continuous (rather than an intermittent) tone from the alarm unit 10, a malfunction of the flasher 15. Also, variations in pulse rate of the unit 10 will indicate a burned-out lamp 17.

Another switch, 19, may be connected to the speedometer of the vehicle to close when a predetermined speed has been exceeded. Adjustable switches such as the switch 19 are already in use in a number of vehicles, so that the present invention allows the elimination of the separate aural alarm commonly used therewith. Since no separate indicator is used with this function, the lead 20 from the switch 19 does not require an isolation diode in the distribution circuit 12. A parking brake switch 21 and a normally open brake cylinder pressure switch 22 likewise require no isolation diodes within the distribution circuit 12 for their leads 23 and 24. The switches 21 and 22 are connected to the cold side of the vehicle ignition switch 25 to prevent an undesired alarm signal when the vehicle is not being operated.

A conventional engine oil pressure light 26 and a cooling-system temperature warning light 27 are also connected, through the sensor switches 28 and 29, to the cold side of the ignition switch 25. The ungrounded sides of the lamps 26 and 27 are connected by means of the leads 30 and 31 respectively to a pair of inputs 13 of the distribution circuit 12; these inputs 13 are provided with isolation diodes 14 to preclude a false indication of the lamps 26 and 27 when one of the switches 28 and 29 closes.

Figure 2:
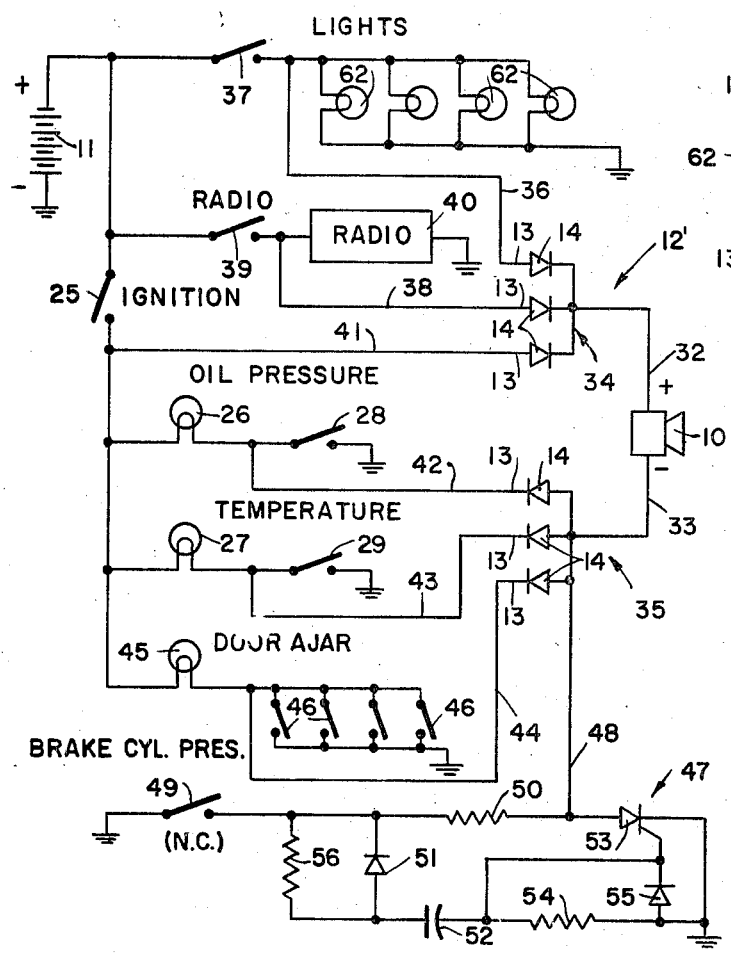
FIG. 2 is a schematic diagram of a second form of the invention.

It will thus be appreciated that the alarm unit 10 will sound when any one of a plurality of conditions occurs within the vehicle, and that some of these conditions are compound events—e.g., the parking brake alarm, which sounds only with the parking brake engaged and the ignition switch closed. In the circuit of FIG. 1, however, only one terminal 32 of the alarm unit 10 is fed from the distribution circuit 12; the other terminal 33 is grounded and serves merely as a current return path. The circuit of FIG. 2 illustrates an alarm system according to the invention in which the distribution circuit 12 is connected to both terminals 32 and 33 of the alarm unit 10, and in which other modifications are made. (The functions of FIG. 1 which are not to be modified are not repeated in the circuit of FIG. 2.)

The distribution circuit 12' of FIG. 2 has a first branch 34, connected to the terminal 32 of the alarm unit 10, and a second branch 35 connected to the terminal 33 of the unit. Each branch has a plurality of inputs 13 and isolation diodes 14. A lead 36 is connected to a point between the vehicle's light switch 37 and its headlamps and taillamps 62 and to an input 13 of the distribution circuit branch 34. Another lead 38 is similarly connected to a point between the radio power switch 39 and to the vehicle radio 40. A third lead 41 connects the cold side of the ignition switch 25 to the branch 34. Thus the leads 36, 38 and 41 supply power through isolation diodes 14 in the branch 34 of the distribution circuit 12' to the terminal 32 of the alarm unit 10 whenever the headlamps 37 or the radio 40 or the ignition switch 25 is on.

The branch 35 of the distribution circuit 12' is connected to an opposite terminal 33 of the alarm unit 10. Here, one side of the oil pressure sensor switch 28 is grounded, so that the lead 42 from the branch 35 provides a ground return path for the terminal 33 whenever the sensor switch 28 closes to indicate a low engine oil pressure. Likewise, a lead 43 provides a ground return whenever the switch 29 closes to indicate an abnormal engine temperature. A "door ajar" function may be similarly provided by means of a lead 44 connected to a dome light or indicator lamp 45 and a plurality of door switches 46 arranged in parallel. Isolation diodes 14 are provided for the leads 42, 43 and 44 to prevent the lighting of all the lamps 26, 27 and 45 upon the occurrence of a single malfunction. A fail-safe brake cylinder pressure failure circuit, indicated generally by 47, is connected to the branch 35 by a lead 48 without an isolation diode, since no separate indicator is used for this function. The pressure-failure circuit 47 contains a normally closed grounded pressure switch 49 connected to the lead 48 through a resistor 50 of sufficiently large value that the alarm unit 10 will not sound when the switch 49 is closed. When, however, the switch 49 opens because of low brake-cylinder pressure, a voltage step is transmitted through the diode 51 and the capacitor 52 to the gate of a silicon-controlled rectifier 53; the SCR 53 is then latched in a conducting state, thus providing a ground return path for the lead 48 and causing the alarm 10 to continue to sound until power is removed from the branch 34 of the distribution circuit 12'. The resistor 54 limits the gate current applied to the SCR 53, and the diode 55 prevents an inadvertent incorrect polarity from damaging the SCR. The resistor 56 permits charge to leak off the capacitor 52 when the switch 49 is closed.

Returning now to the branch 34 of the distribution circuit 12', it will be appreciated that power is supplied to the terminal 32 of the alarm unit 10 when any of the switches 25, 37 and 39 is closed. One aspect of this arrangement is that the switches 28, 29, 46 and 49 become capable of sounding the alarm unit 10 only under circumstances in which the vehicle is being, or is about to be, operated. For instance, a loss of engine oil pressure with the ignition switch 25 in its off position is a normal condition, and will not cause the alarm unit 10 to sound. The lead 41, however, assures that the switches 28, 29, 46 and 49 will be operative at all times when the ignition switch 25 is in its closed position. Another aspect of the arrangement of the circuit is that power will be supplied to the branch 34 whenever the lamps 37 or the radio 40 are energized, even though the ignition switch 25 is open. Since, under this condition, the switch 28 will be closed, and other sneak paths will also exist to ground, the branch 35 will be grounded, and the alarm unit 10 will sound. Therefore, the circuit of FIG. 2 will warn against discharge of the battery 11 by indicating the presence of large electrical loads when the engine is not running.

Figure 3:
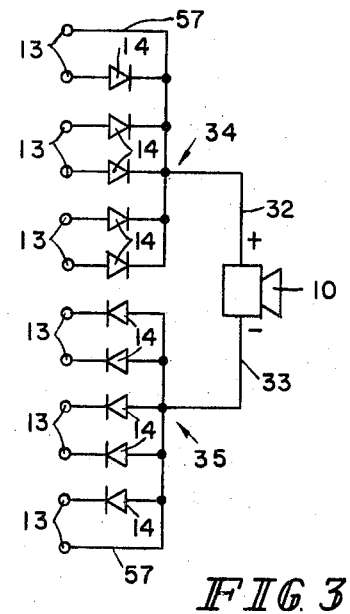
FIG. 3 shows a schematic diagram of an alarm and distribution circuit according to the invention.
Figure 4:
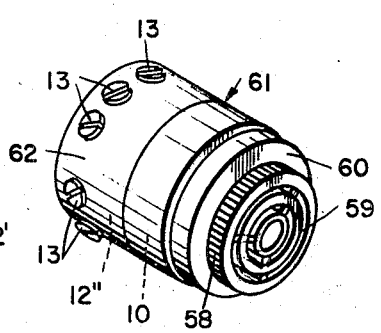
FIG. 4 is a perspective view of an alarm and distribution unit.

In some cases it may be desirable to place the isolation diodes 14 near the points at which the various leads are tied into the vehicle's wiring system, in order to reduce the number of leads. In most cases, however, it will be advantageous to combine a distribution circuit such as 12" of FIG. 3 with an alarm unit 10 into an alarm system unit made in a single package. In order to accomplish this objective without sacrificing versatility of the unit, the distribution circuit 12" contains a plurality of isolation diodes 14 in each of the branches 34 and 35 for the inputs 13. Additionally, one input 57 in each branch is without an isolation diode for those leads (such as 23, 24 and 48) which do not require isolation from each other. FIG. 4 shows a perspective view of a physical embodiment of the circuit of FIG. 3. A detachable mounting ring 58 surrounds an acoustical passage 59 for the transmission of sound from a potted alarm unit 10 having a ceramic electroacoustical transducer mounted in the passage 59. A shoulder 60 in the sealed plastic body 61 allows mounting the entire unit on a dashboard or the like. The distribution circuit 12" is potted within another section of the body 61, the input terminals 13 being arranged therearound. The terminals 13 may be differentiated by markings on the body 61 or by spatial arrangement, such as, for instance, a space 62 between the terminals of the branch 34 and those of the branch 35. With this unitary construction, the only parts of the alarm system external to the body 61 are the lead wires for tying into the various switches.

Having described several preferred forms of my alarm system by way of illustration rather than limitation, I claim as my invention:

1. A multiple-condition alarm system for a motor vehicle having an ignition switch having a hot side connected to a source of electrical potential and a cold side, said alarm system comprising an electrically operated audible alarm unit having a pair of terminals, a distribution circuit including first and second branches each connected to one of said alarm-unit terminals, a plurality of switches each responsive to a particular condition within said vehicle, a first group of said switches connected to the hot side of said ignition switch and a second group of said switches connected to the cold side of said ignition switch, a plurality of lead wires connecting said first and second groups of switches to the first and second branches respectively of said distribution circuit, and a lead wire connecting the cold side of said ignition switch to the first branch of said distribution circuit, whereby the closure of a switch of said first group only while said ignition switch is open or the closure of a switch of said second group only while said ignition switch is closed will cause said alarm unit to be energized.

2. The alarm system of claim 1 wherein said first group of switches includes a switch for a system of external lighting for said vehicle.

3. The alarm system of claim 1 wherein at least one of the branches of said distribution circuit includes a plurality of diodes for isolating certain of said leads from others in the same branch.

4. The alarm system of claim 1 wherein one of said switches is normally closed and wherein the opening of said switch triggers a circuit including a silicon-controlled rectifier and connected to said distribution circuit to cause said alarm unit to be energized and to remain energized until electrical power is removed therefrom.

5. The alarm system of claim 1 wherein said first group of switches includes a switch for a radio of said vehicle.

6. The alarm system of claim 1 wherein said second group of switches includes a switch for the oil pressure system of said vehicle.

7. The alarm system of claim 1 wherein said second group of switches includes a switch for the temperature-indicating system for said vehicle.

8. The alarm system of claim 1 wherein said second group of switches includes a switch energizing the dome light for said vehicle.

9. The alarm system of claim 1 wherein said second group of switches includes a switch for the master brake cylinder of said vehicle.

* * * * *